U. C. TAINTON.
ELECTROLYTIC RECOVERY OF METALS FROM THEIR SOLUTIONS.
APPLICATION FILED JULY 6, 1915.
1,251,302.  Patented Dec. 25, 1917.
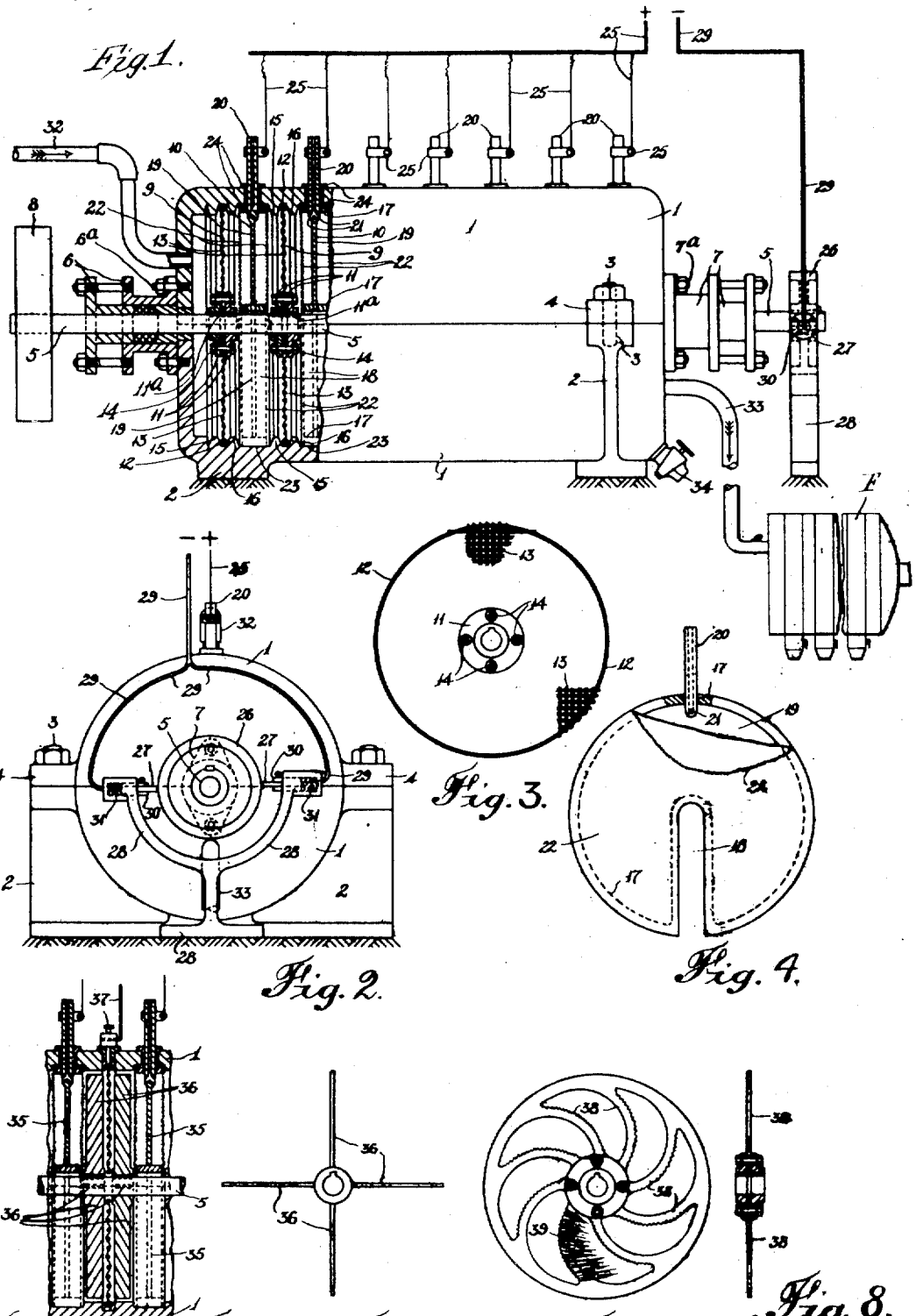
Witness:
A. Thompson
Inventor:
Urlyn Clifton Tainton

UNITED STATES PATENT OFFICE.

URLYN CLIFTON TAINTON, OF JOHANNESBURG, TRANSVAAL, SOUTH AFRICA.

ELECTROLYTIC RECOVERY OF METALS FROM THEIR SOLUTIONS.

1,251,302.   Specification of Letters Patent.   Patented Dec. 25, 1917.

Application filed July 6, 1915. Serial No. 38,303.

*To all whom it may concern:*

Be it known that I, URLYN CLIFTON TAINTON, B. Sc., a subject of the King of Great Britain, and resident of Johannesburg, Transvaal Province, Union of South Africa, have invented new and useful Improvement in the Electrolytic Recovery of Metals from Their Solutions, of which the following is a specification.

This invention consists of improvements in the electrolytic precipitation of metals from solutions of their salts.

The object of the invention is to effect a more rapid and complete precipitation of the metal or metals than is at present obtained, and also to facilitate the recovery of said metal or metals after precipitation.

In carrying out the invention the solution which is to be treated—as for example dilute aurocyanid solution obtained in leaching gold or silver ores—is caused to flow through a vessel in which the electrodes are placed; and the apparatus is so designed as to cause a rapid motion of the cathode relatively to the solution, or vice versa. This may be accomplished, for example, by imparting to the cathode or to the solution a rotary or reciprocating motion.

The nature of the solution is preferably such, and the distribution of the current on the cathode is so arranged, that the metal is precipitated in a loose, spongy or otherwise non-adherent form, so as to be easily detached by the scouring action of the solution arising from the frictional resistance between the solution and the cathode. The deposition of the metal in this form may be effected in most cases by electrolyzing the solution with a current of high density. Where the nature of the solution is such as to interfere with the deposition of the metal in the form described, other substances may be added to the solution in order to produce the desired results, as for example, small quantities of zinc or lead salts or finely powdered graphite or oily materials.

If desired other methods of removing the metal from the cathode may be employed; for example, mechanical brushes may be arranged to operate on the surfaces of the cathodes or granular matter be introduced at suitable intervals with the electrolyte in order to increase the scouring action, or jets of gas under pressure could be caused to impinge upon the surfaces of the cathodes.

The solution after the precipitation of its metal contents leaves the precipitating vessel carrying the metal in suspension, and this metal may be readily recovered by filtration or settlement.

In order to recover the remaining values, the solution carrying the metal in suspension may be passed through an electrolytic filter made of suitable conducting material, to which a negative voltage is applied, such as that described in a previous application for patent made by the present applicant and M. F. L. A. Aymard under Serial Number 872,132. If the said electrolytic filter be used, the precipitated metal may, if desired, be utilized to form the porous electrode through which the solution is caused to flow by means of a difference of pressure at the opposite sides of the electrode.

The invention will be further described with the aid of the accompanying drawings wherein I illustrate a suitable form of the apparatus and various modifications.

Figure 1 is a part sectional side elevation of one construction of the complete apparatus.

Fig. 2 is an end elevation of Fig. 1 as seen from the outlet end.

Fig. 3 is a front elevation of one of the revoluble cathodes shown in Fig. 1, detached.

Fig. 4 is an elevation of one of the stationary anodes shown in Fig. 1, detached.

Fig. 5 is a sectional side elevation of a portion of the apparatus illustrating certain modifications.

Fig. 6 is a front elevation of the rotating paddles or radial agitating arms, shown in Fig. 5.

Figs. 7 and 8 are front and sectional side elevations of a modified form of revoluble cathode.

Referring more particularly to the apparatus illustrated in Figs. 1 to 4, the numeral 1 denotes the vessel through which the solution is caused to flow. This vessel is shown constructed in halves longitudinally so as to allow of the removal of the upper half when necessary. The lower half is shown constructed integral with the standards or supports 2—see Figs. 1 and 2. The halves are fixed together by means of the studs or the like 3 engaging holes in flanges 4 on the upper half of the vessel 1 and fixed in the standards or supports 2.

The vessel 1, which is shown of cylindrical shape, is constructed to support a longitudinal shaft 5 which is journaled, or runs in bearings at the ends of the vessel 1; 6, 7 being stuffing boxes and glands for preventing the escape of solution between the shaft 5 and the ends of the vessel. The studs 6$^a$, 7$^a$ which serve for fixing the stuffing boxes 6, 7 to the upper half of the vessel 1, engage in slots in the stuffing box flange so as to allow of the removal of said upper half without disconnecting the stuffing boxes from the lower half of the vessel. 8 is a driving pulley fixed on one end of the shaft 5.

9 represent the cathodes which are arranged within the vessel 1 and alternate with the anodes 10. Any suitable number of alternating anodes and cathodes are provided so as to insure satisfactory precipitation of the metal or metals from the solution which is to be treated.

All the cathodes are preferably of identical construction, and as shown more particularly in connection with Fig. 3, each of said cathodes consists of a boss or hub portion 11—shown comprising two flanged rings, secured on the shaft 5 by means of key 11$^a$—a wire stiffening ring 12 and a piece or disk of wire gauze 13 which is secured at the center between the parts of the hub 11 by means of the bolts 14 and its outer edge is suitably secured to the stiffening ring 12. The casing or vessel 1 is provided interiorly with annular grooves or recesses forming projections 15, 16, between which the rings 12 forming the outer edges of the cathodes, revolve so as to insure the solution flowing through the interstices of the wire gauze 13 of cathodes 9.

All the anode members are also preferably of identical construction, and, as shown more particularly in Figs. 1 and 4, they each comprise a frame or rim portion 17 made of any suitable non-conducting material. This frame, as shown, is constructed to provide a passage 18 for the solution to pass from cathode to cathode. In the frame 17 there is arranged a plate 19 of lead or the like which is shaped to fit the frame. This plate 19 is constructed with a tubular projection 20 which serves as the outlet for the evolved oxygen or other gas. The bore of the tube 20 communicates through inclined passages 21 with the opposite side of plate 19. 22 are fabric coverings stretched over both sides of the frame 17 and inclosing the lead sheet 19 and forming porous diaphragms which separate the solution from the anode 19, thereby preventing the anode products from mixing with the solution and causing re-solution of the precipitated gold or other metal.

With the object of preventing disintegration of the anodes, the anode compartments may be filled or partially filled with an alkaline sulfate solution.

The anodes which are placed intermediate the cathods are retained in position by fitting them into the annular recesses 23 formed between the projections 15, 16 of adjacent cathodes. The tubular extensions 20 of the stationary anodes project through insulating sleeves or bushes 24, arranged in openings in the upper half of the vessel 1. 25 are the wires and connections from the several anodes to the positive pole of a dynamo or other source of electric energy. The shaft 5 is utilized as the conductor for the current to the several cathodes and for this purpose a slip ring 26 is fixed on the one end of the shaft 5, and contact brushes 27 arranged to coöperate therewith. 28 is a bracket which serves for carrying the brushes 27. The wires and connections 29 from the brushes 27 lead to the negative pole of the dynamo or other source of electric energy. 30 are sliding guides for the brushes 27, and 31 are springs, which are engaged by the guides 30, for keeping the brushes in contact with the slip ring 26.

32 is the inlet or feed pipe for the solution which passes into one end of the vessel 1 in front of the first cathode 9, and 33 is the outlet or delivery pipe for the solution carrying the gold or other metal in suspension, which pipe communicates with the opposite end of said vessel. 34 is a valve provided in or near the bottom of the lower half of the vessel 1 for use in washing out or otherwise removing any sediment or deposit.

The solution which is introduced into the vessel 1 through the pipe 32 passes through the interstices of the first cathode 9; partial precipitation of the metal contents of the solution taking place on the wire gauze cathode 13. The deposited metal is detached by the scouring action of the solution and is carried by the solution through the passage 18 in the first anode 10. The solution then passes through the interstices of the next rotating cathode and in doing so further precipitation of the metal contents of the solution takes place. The metal which is precipitated on the second cathode is similarly detached by the scouring action of the solution and passes with the solution through the passage 18 of the next anode and so on until the solution, carrying the gold or other metal in suspension finally passes out of the vessel through the discharge pipe 33.

After passing through the vessel 1 the solution carrying the gold or other metal in suspension is passed through say, a filter or settlement vat in which the gold or other metal is deposited.

If desired this filter F, shown diagrammatically in Fig. 1, may be of the type described in the specification of the prior application for patent Serial Number 872,132, in which a voltage is applied to a cake of conducting material so as to form a porous cathode.

Instead of imparting a rotary motion to the cathodes, rapid relative movement between the cathodes and the solution may be produced in any suitable manner, as by causing rotation of the liquid. If desired, suitable means may be provided, such as paddles, for agitating the mixture.

In Figs. 5 and 6 I show an arrangement in which the vessel, cathodes and anodes are all stationary and paddles are provided for agitating the mixture as it flows through the vessel. In this case the anodes 35 are constructed and arranged in the vessel 1 in the manner described in connection with Figs. 1 to 4. The cathodes which are positioned between the anodes are free from the shaft 5 and radial paddles or agitating blades 36 are fixed on the shaft 5 at both sides of each wire gauze cathode. 37 are the electric connections of the cathode, which connections pass through the wall of the vessel.

In Figs. 7 and 8 I illustrate a cathode which may be used in substitution for the cathode made of wire screening as hereinbefore described. In this form I use a wheel-like structure designed to take up and hold threads or filaments of metal or other conducting material which may be introduced with the inflowing solution. The arms 38 of this cathode are provided with serrated edges or with teeth or notches, which serve, as indicated at 39 for carrying around the threads or filaments which form a base for the deposition of the metal out of the solution. The filiform or thread-like metal employed is preferably such that it can be conveniently dissolved by passing some solvent into the vessel which will not attack the material of which the apparatus itself is made; as for example zinc filaments and a solvent consisting of dilute hydrochloric acid.

As the efficiency of the precipitation depends on the degree of intimacy of contact of the solution with the cathode and as this may be increased indefinitely by using a wire gauze or other cathode with small interstices and giving this a very rapid movement, a very rapid precipitation of the metal is obtained.

The gold is recovered directly from the filter or settlement vat without the necessity for detaching it from the cathode or any other intermediate treatment.

A further advantage of my invention as applied to the cyanid treatment of gold or silver ores is that solutions of high base metal content or very low free cyanid content may be successfully precipitated, and a still further advantage is that there is no zinc or cyanid consumed by the apparatus during the precipitation of cyanid solutions.

If deposits of calcium carbonate or other non-conducting matter tend to form on the cathodes this may be removed by the introduction into the apparatus of a suitable solvent; as for example an acid wash.

What I claim as my invention and desire to protect by Letters Patent is:—

1. The process of precipitating metals from solutions, which consists in introducing the solution into an electrolytic cell, producing therein a rapid relative movement between the cathode and the solution whereby the metal precipitated on the cathode is detached therefrom, and removing the precipitated metal from the cell.

2. The process of precipitating metals from solutions, which consists in introducing the solution into an electrolytic cell, imparting a rapid movement of the cathode relative to the solution whereby the metal precipitated on the cathode is detached therefrom, and removing the precipitated metal from the cell.

3. The process of precipitating metals from solutions, which consists in introducing the solution into an electrolytic cell, imparting rapid rotary movement to the cathode whereby the metal precipitated on the cathode is detached therefrom, and removing the precipitated metal from the cell.

4. The process of precipitating metals from solutions, which consists in introducing the solution into an electrolytic cell, producing therein a rapid relative movement between the cathode and the solution whereby the metal precipitated on the cathode is detached therefrom, controlling the strength of current on the cathode to effect precipitation of the metal in an easily detachable condition, and removing the precipitated metal from the cell.

5. The process of precipitating metals from solutions, which consists in introducing the solution into an electrolytic cell, producing therein a rapid relative movement between the cathode and the solution whereby the metal precipitated on the cathode is detached therefrom, adding an agent to assist precipitation of the metal on the cathode in an easily detachable condition and removing the precipitated metal from the cell.

6. The process of precipitating metals from solutions, which consists in introducing the solution into an electrolytic cell, producing therein a rapid relative movement between the cathode and the solution whereby the metal precipitated on the cathode is detached therefrom, removing the precipitated metal from the cell, and separating the removed metal from the accompanying solution by filtering.

In testimony whereof I have signed my name to this specification in the presence of two subscribing witnesses.

URLYN CLIFTON TAINTON.

Witnesses:
CHAS. OVENDALE,
A. THOMPSON.